March 11, 1952  W. W. BRANNEN  2,588,955
HYDRAULIC BRAKE ADJUSTER
Filed May 13, 1947
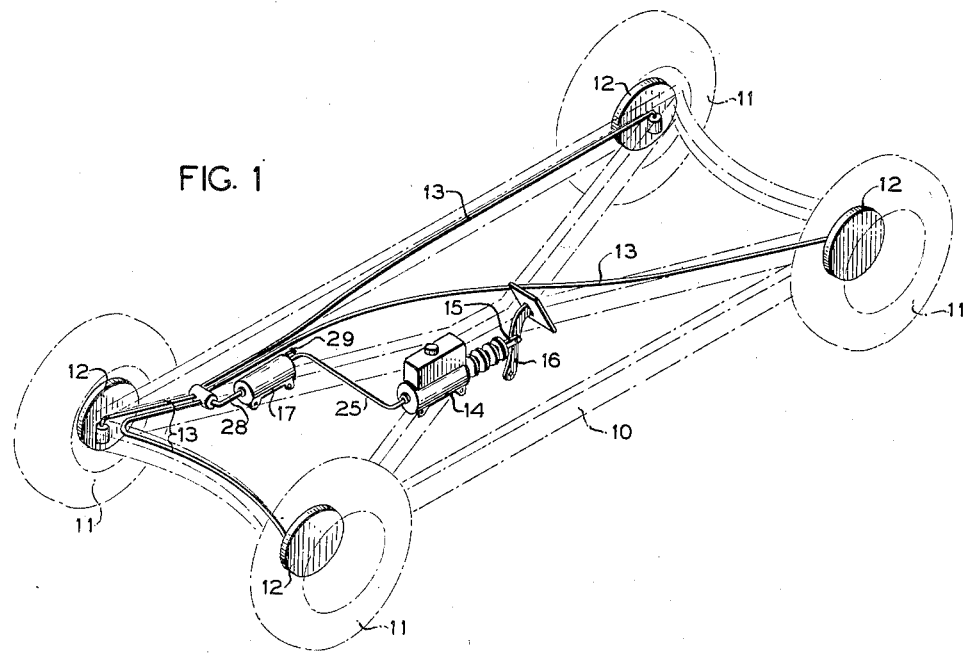
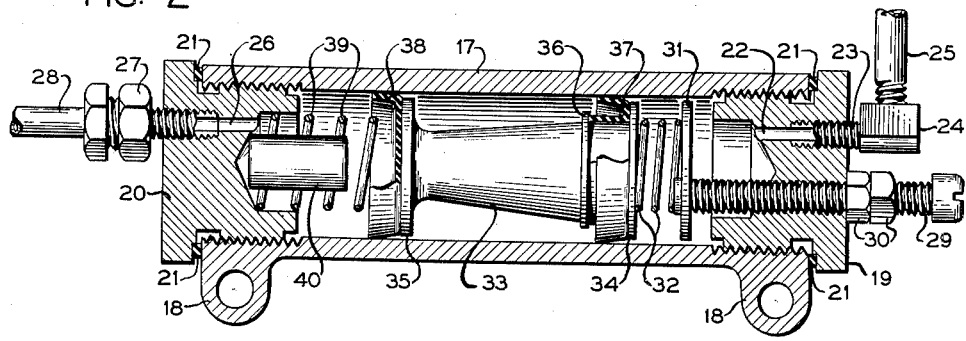
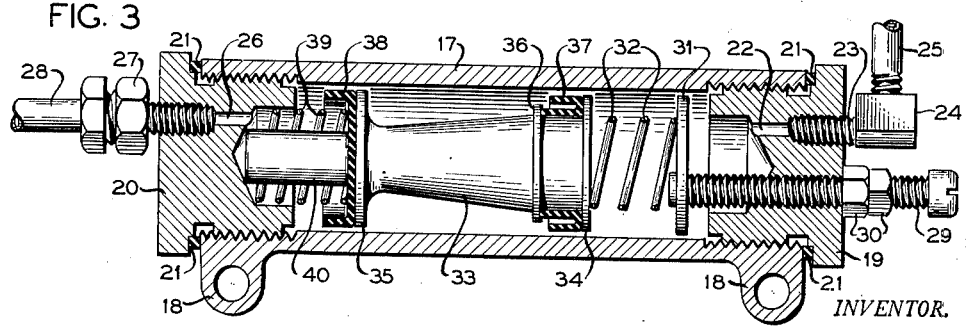
INVENTOR.
W. W. BRANNEN
BY
ATTORNEY Patented Mar. 11, 1952

2,588,955

UNITED STATES PATENT OFFICE 2,588,955

HYDRAULIC BRAKE ADJUSTER

Wiley W. Brannen, Statesboro, Ga., assignor of one-half to Alfred A. Dorman, Statesboro, Ga.

Application May 13, 1947, Serial No. 747,859

7 Claims. (Cl. 60—54.5)

This invention relates to motor vehicles having braking systems, and more particularly to the maintenance of braking systems in proper adjustment for maximum efficiency of operation.

The invention is directly concerned with braking systems which are hydraulically operated, and are actuated by means of a foot pedal for causing operation of the brakes, ordinarily one adjacent each of the four wheels of the vehicle.

After operation of the vehicle for a period of time and when the brake linings have become worn it has been necessary to make an individual adjustment of the brake adjacent each wheel of the vehicle. Consequently, an adjustment is a time-consuming operation in which considerable difficulty is frequently experienced in obtaining and maintaining the proper adjustment and equalization of the brakes, even for a skilled mechanic. Therefore, in view of the fact that the brakes are such an important part of the vehicle it is highly desirable to provide the most efficient brakes and keep them perfectly adjusted.

It is an object of the present invention to simplify the adjustment of hydraulically operated brakes of motor vehicles, to reduce the time required and cost of such adjustment, as well as to improve the service and efficiency of the brakes.

A further object of the invention is to provide simple and inexpensive mechanism by means of which the superior results are obtained, and to provide mechanism which can be easily applied to brakes of automobiles already in use.

Further objects and advantages will be apparent from the following description taken in conjunction with the accompanying drawing, wherein:

Figure 1 is a diagrammatic view illustrating a frame or chassis and braking system of an automobile with the present invention applied thereto:

Fig. 2, a longitudinal section through the auxiliary braking cylinder constituting the essence of the present invention; and Fig. 3, a similar view with the parts in different positions.

With continued reference to the drawing, as shown in Figure 1, the frame or chassis 10 of an automobile is supported by wheels 11, and has brake drums 12, of which there are four in number. The brakes which operate in conjunction with the drums 12 of each wheel are of conventional construction, and are supplied with braking fluid through conduits 13 from a master cylinder 14, and the piston in the master cylinder is connected to the brake pedal 16 so that when the pedal is depressed the brakes will be operated, the pressure on each brake being equal. With the conventional brakes the hydraulic braking fluid is supplied directly from the master cylinder 14 through the conduits or brake lines 13 directly to the brakes in connection with the wheels of the vehicle.

The present invention adds an auxiliary cylinder 17 for providing for easy adjustment of the position of the brake pedal, and automatic adjustment of the brakes. The auxiliary brake cylinder 17 may be mounted in any desired manner on the chassis of the vehicle as, for example, with apertured lugs 18 through which suitable clamping bolts may be applied.

Threaded into the ends of the auxiliary cylinder 17 are plugs 19 and 20, gaskets 21 being employed for making tight joints. The end plugs 19 and 20 are substantially identical, the plug 19 being provided with a port 22 through which brake fluid is adapted to flow into the auxiliary cylinder through a connection having a threaded nipple 23 engaging similar threads in the plug, and having a lateral portion 24 internally threaded for receiving by a suitable connection the tube 25 from the master cylinder. The plug 20 is provided with a port 26 into which is threaded a coupling 27, which coupling 27 is adapted to couple or fasten to a tube 28, forming a part of the brake line, thus the hydraulic brake fluid can enter the auxiliary cylinder through the coupling 24, and pass out through the coupling 27.

An adjusting screw 29 is threaded through the plug 19, and is adapted to be secured in axially adjusted position by means of lock nuts 30. On the other end of the adjusting screw 29 within the cylinder 17 swively and eccentrically mounted is a pressure disc or plate 31.

Adjustment of the plate or disc 31 longitudinally within the cylinder 17 serves to vary tension on a helical spring 32 which bears against one end of a piston 33. The piston 33 is provided with extremities in the form of discs 34 and 35 of a diameter slightly smaller than the internal diameter of the auxiliary brake cylinder 17. The piston 33 is also provided with an annular flange 36 adjacent the enlarged flanged end 34. Between the flanges 34 and 36 a hollow cup-shaped washer 37 is disposed and which fills the space between the piston and the internal wall of the cylinder so that pressure on its cup side will form a tight seal between the piston and the cylinder, but this piston packing will permit a slight amount of fluid to flow in the opposite direction.

Against the end disc 35 of the piston another cup packing 38 is disposed, and is held in such position by means of a second helical spring 39 bearing against the inner surface of the plug 20, but encompassing a stop 40 to limit the movement of the piston toward the plug 20 in the same manner that the disc 31 applies pressure to the spring 32, and limits the movement of the piston toward the plug 19.

The auxiliary cylinder and associated parts do not interfere with the normal operation of the braking system of the vehicle. The braking fluid will be forced into the auxiliary cylinder through the line 25 and discharged from the auxiliary cylinder into the line 28. In other words, when the foot pedal 16 is depressed the piston of the master cylinder, which is similar to the piston of the auxiliary cylinder, will increase pressure of the fluid in the oil line through the auxiliary cylinder. The pressure is transmitted to the oil line by the piston of the auxiliary cylinder, and if the brakes are not worn no exchange of oil will occur between the master cylinder and the system beyond the auxiliary cylinder. Later, however, when the brake linings are worn in order to compensate for such wear the piston in the auxiliary cylinder will be moved axially until it engages the plug 40 in the discharge end of the auxiliary cylinder, whereupon with the piston unable to move further toward the discharge end of the auxiliary cylinder fluid from the master cylinder will be forced around the gaskets 37 and 38 into the system until sufficient to compensate for the wear on the brake linings. Release of the brake pedal will permit the piston 33 to return to its normal position, and in so doing the gaskets 37 and 38 will expand into contact with the inner wall of the auxiliary cylinder, confining the oil that has bypassed to the side of the gaskets nearest the discharge end of the auxiliary cylinder, and the brake lines extending therefrom to the several brakes, consequently providing automatic brake adjustment.

Adjustment of the pressure plate or disc 31 by the screw 29 to which it is swivelly connected will vary the tension on the springs 32 and 39, and thus determine the position at which the brake pedal takes effect. This adjustment, therefore, makes it possible to adjust the travel of the brake pedal so that it will actuate the brakes with only a slight depression, or any additional degree of depression selected or desired in accordance with the proper adjustment. This adjustment requires no particular skill, but can be made by an unskilled mechanic or laborer.

From the foregoing it will be readily understood that by addition of the auxiliary brake cylinder of the present invention automatic adjustment of the brakes is maintained and with a simple adjustment the position of the brake pedal is controlled.

It will also be readily apparent that the invention is relatively simple and inexpensive, and may be easily applied or removed, and is much to be desired in the braking systems of motor vehicles.

It will be obvious to those skilled in the art that various changes may be made in the invention without departing from the spirit and scope thereof, and therefore the invention is not limited by that which is shown in the drawing and described in the specification, but only as indicated in the appended claims.

What is claimed is:

1. A combination brake pedal position and brake adjustor for application in a hydraulic braking system of a vehicle, and comprising a cylinder adapted to contain hydraulic brake fluid, and having inlet and exhaust ports by means of which hydraulic force can be received in and imparted from said cylinder, a piston in said cylinder having flanges extending radially from its axis and terminating in spaced relation to the inner cylinder wall, a packing cup adjacent each of said flanges and constructed to seal against the cylinder wall, said packing being constructed and arranged to seal tightly against the cylinder wall upon receipt of pressure on the side of the packing nearest the discharge port, and adapted to offer limited seal action against the cylinder wall upon the application of pressure on the opposite side of the packing, spring means at opposite end of said piston tending to maintain said piston in a definite position, means for varying the pressure on said spring means for determining the travel of the brake pedal, and a stop for limiting the endwise movement of the piston toward the discharge port for causing increase in fluid pressure on the opposite side of the packings from such stop to cause the flow of additional fluid around said packings from the inlet port to the discharge port of the cylinder.

2. A combination brake adjuster for application in a hydraulic breaking system of a vehicle, and comprising a cylinder adapted to contain hydraulic brake fluid, and having inlet and exhaust ports by means of which hydraulic force can be received in and imparted from said cylinder, a piston in said cylinder having flanges extending radially from its axis and terminating in spaced relation to the inner cylinder wall, a packing cup adjacent each of said flanges and constructed to seal against the cylinder wall, said packing being constructed and arranged to seal tightly against the cylinder wall upon receipt of pressure on the side of the packing nearest the discharge port, and adapted to offer limited sealing action against the cylinder wall upon the application of pressure on the opposite side of the packing, spring means tending to maintain said piston in a definite position, means for varying the pressure on said spring means for determining the travel of the brake pedal, and a stop for limiting the endwise movement of the piston toward the discharge port.

3. For use in the hydraulic braking system of a vehicle a cylinder having inlet and discharge ports for the brake fluid, a piston movable between said ports, packing cups disposed one adjacent each end of said piston, spring means tending to maintain said piston in a definite position, said packing cups tending to seal upon application of pressure at one side, and to unseal by application of pressure at the opposite side, a stop for limiting the movement of said piston so that pressure on the unsealing side of said packings will cause flow around the packings in the cylinder, and means for adjusting the tension on said spring means thereby varying the position at which the brake pedal will become operative to actuate the brakes.

4. A hydraulic brake adjuster comprising a cylinder having an inlet at one end and an outlet at the other end, a piston mounted for reciprocation within said cylinder, means on said piston permitting fluid to flow from the inlet side thereof to the outlet side and preventing fluid from flowing from the outlet side to the inlet side of said piston, spring means extending between said piston and the outlet end of said cylinder for urging said piston away from said outlet end of said cylinder, and adjusting means reacting against said piston for determining the normal adjusted position of said piston.

5. A hydraulic brake adjuster comprising a cylinder having an inlet at one end and an outlet at the other end, a piston mounted for reciprocation within said cylinder, means on said piston permitting fluid to flow from the inlet side thereof to the outlet side and preventing fluid from flowing from the outlet side to the inlet side of said piston, spring means extending between said piston and the outlet end of said cylinder for urging said piston away from said outlet end of said cylinder, other spring means extending between said piston and the inlet end of said cylinder, screw means extending through said inlet end of said cylinder for adjusting the position of the inlet end of said other spring for determining the normal adjusted position of said piston.

6. A hydraulic brake adjuster comprising a cylinder having an inlet at one end and an outlet at the other end, a piston mounted for reciprocation within said cylinder, means on said piston permitting fluid to flow from the inlet side thereof to the outlet side and preventing fluid from flowing from the outlet side to the inlet side of said piston, spring means within said cylinder for urging said piston away from the outlet end of said cylinder, a stop for limiting the movement of said piston toward the outlet end of said cylinder, and adjusting means reacting against said piston for determining the normal adjusted position of said piston.

7. For use in the hydraulic braking system of a vehicle a cylinder having inlet and discharge ports for the brake fluid, a piston movable between said ports, packing cups disposed one adjacent each end of said piston, spring means engaging each end of said piston and tending to normally dispose the same substantially midway of said cylinder, said packing cups tending to seal upon application of pressure at one side thereof and to unseal upon application of pressure to the opposite side, a stop for limiting movement of the piston in one direction so that pressure on the unsealing side of said packings will cause flow of fluid thereby, a portion of said spring means tending to return said piston to its original position after contacting said stop, and means for adjusting the tension on said spring means thereby varying the position at which the brake pedal will become operative to actuate the brakes.

WILEY W. BRANNEN.

REFERENCES CITED

The following references are of record in the file of this patent:

UNITED STATES PATENTS

| Number | Name | Date |
|---|---|---|
| 697,140 | Goldschmidt | Apr. 8, 1902 |
| 1,786,231 | Dick | Dec. 23, 1930 |
| 2,156,120 | La Brie | Apr. 25, 1939 |
| 2,240,792 | Liebreich | May 6, 1941 |

FOREIGN PATENTS

| Number | Country | Date |
|---|---|---|
| 365,069 | Great Britain | Jan. 6, 1932 |
| 374,150 | Great Britain | June 6, 1932 |